Jan. 29, 1957  K. MILLER  2,779,425
DRIVING AND BRAKING MECHANISM FOR VEHICLE
STEERABLE WHEEL MEANS
Filed Oct. 25, 1954  2 Sheets-Sheet 2
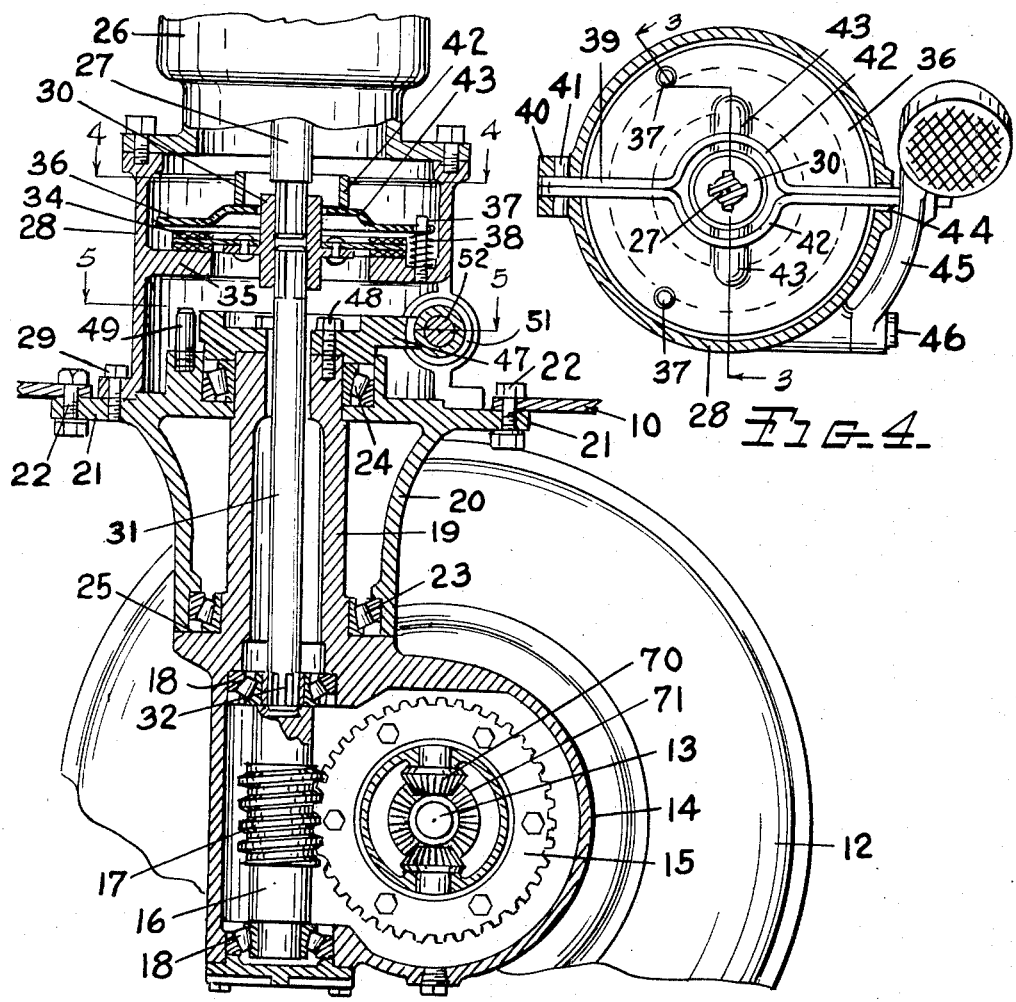
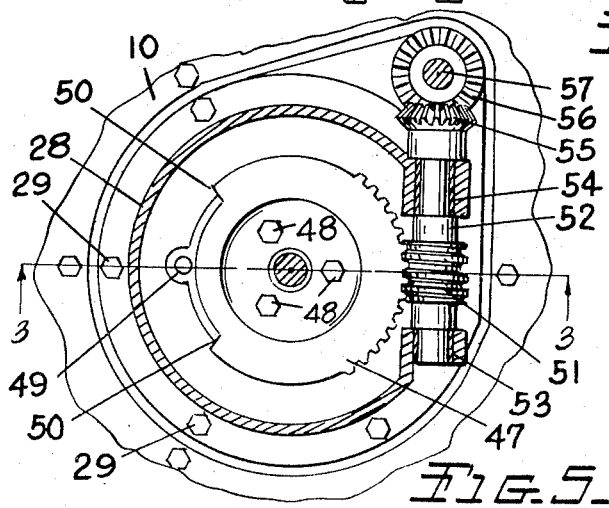
INVENTOR.
Kay Miller
BY Otis A. Earl
Attorney 2,779,425
Patented Jan. 29, 1957

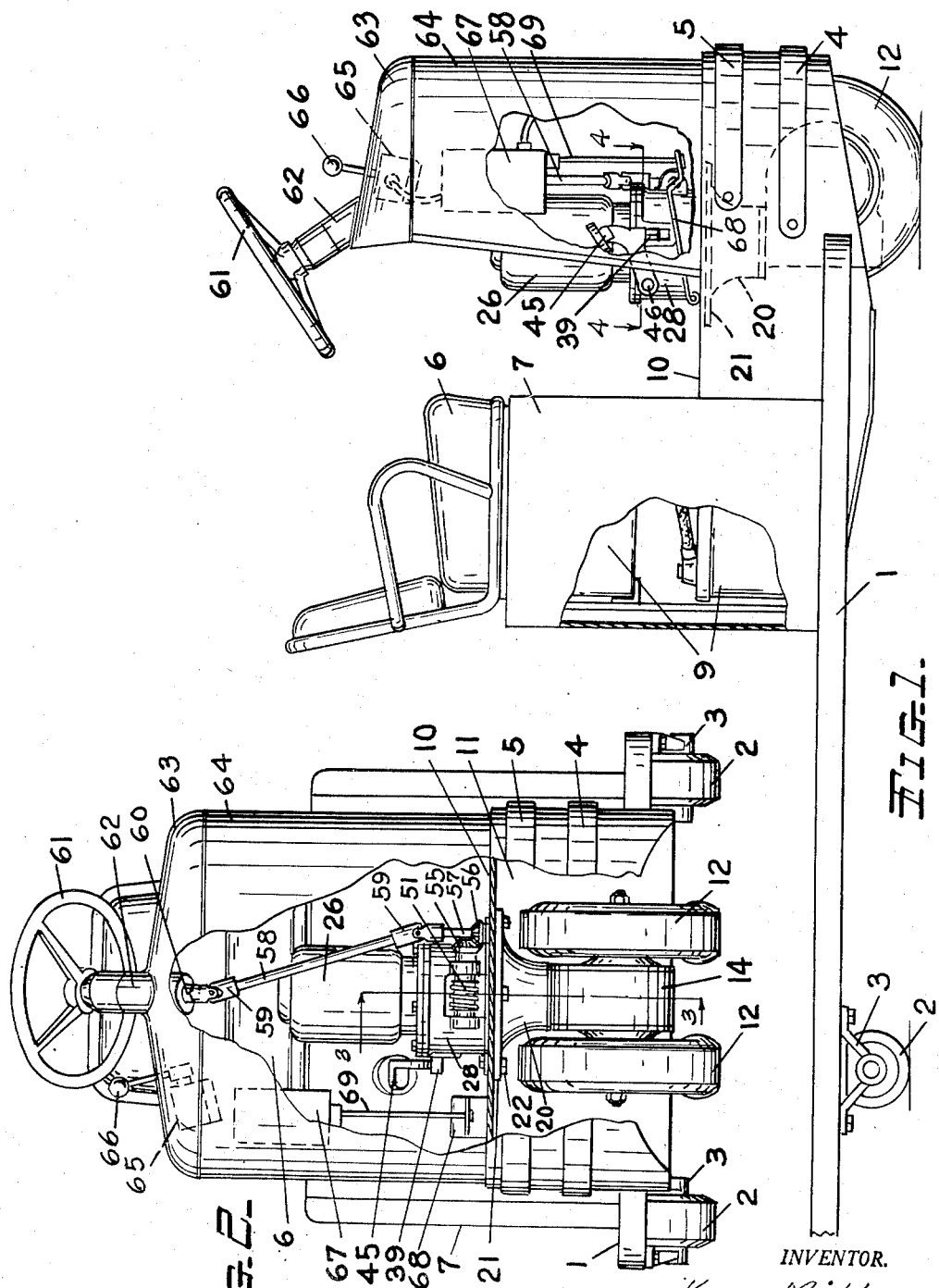

2,779,425

DRIVING AND BRAKING MECHANISM FOR VEHICLE STEERABLE WHEEL MEANS

Kay Miller, Kalamazoo, Mich., assignor to Kalamazoo Manufacturing Company, Kalamazoo, Mich.

Application October 25, 1954, Serial No. 464,348

6 Claims. (Cl. 180—26)

This invention relates to a motor powered vehicle, particularly electric motor powered trucks adapted to be maneuvered in a small area.

The main objects of this invention are:

First, to provide a motor powered truck in which the motor and associated parts are compactly arranged and have relatively simple and direct driving connections with combined driving and steering wheels.

Second, to provide a motor powered vehicle in which the motor is nonrotatably mounted with its shaft in a vertical position with only two gears in its drive connection to the driving wheels.

Third, to provide a motor powered vehicle having these advantages in which the driving, steering and associated parts are effectively housed and protected.

Objects relating to details and economies of the invention will appear from the description to follow. The invention is defined and pointed out in the claims.

A preferred embodiment of the invention is illustrated in the accompanying drawing, in which:

Fig. 1 is a side elevational view of a motor powered truck embodying my invention, the rear parts of the body being broken away and other parts being broken away to show structural details.

Fig. 2 is a front elevational view with parts broken away and in section to show the relative arrangement thereof.

Fig. 3 is an enlarged fragmentary view in vertical section on a line corresponding to line 3—3 of Figs. 2, 4 and 5.

Fig. 4 is a horizontal section on a line corresponding to line 4—4 of Figs. 1 and 3.

Fig. 5 is a fragmentary view partially in section on a line corresponding to the line 5—5 of Fig. 3.

The embodiment of my invention illustrated comprises a chassis or truck body 1 having rear wheels 2 mounted thereon by brackets 3. The front end of the body is provided with bumper like reinforcing members 4 and 5 desirably curved for rounded to eliminate corners.

The seat 6 is mounted upon the housing 7 for storage batteries indicated conventionally at 9. The truck body or chassis has an elevated operator's platform 10 which also constitutes the top of the chamber 11 for the driving or steering wheels 12 which are arranged in quite closely spaced relation. The axle 13 of these wheels 12 are carried by the gear housing 14. The axle driving gear 15 is arranged in this housing and drivingly connected with the axles 15 through the differential gears 70—71.

The shaft 16 of the driving worm gear 17 is vertically disposed and mounted in bearings 18 provided therefor in the housing 14, see Fig. 3. The housing 14 has a tubular steering column 19 projecting upwardly therefrom and desirably formed integrally therewith. The axis of this column is in alignment with the axis of the gear 17.

The support member 20, desirably a casting, is formed with laterally projecting flanges 21 secured to the platform 10 by means of bolts 22 to depend below the platform.

The steering column is mounted in this support by means of the bearings 23 and 24 which are desirably of the combined axial and radial thrust type of roller bearings. The lower end of the support member is closely adjacent the upwardly facing shoulder 25 at the base of the steering column so that in the event the bearings become loose the axial thrust is sustained in part or wholly by its bearing engagement with the shoulder. However, it is contemplated that there will ordinarily be slight clearance at this point.

The electric motor 26 is disposed with its shaft 27 in vertical alignment or in substantial vertical alignment with the axis of the gear 17. The motor is provided with a chambered base member 28 mounted on the support 20 and secured thereto by means of the screws 29. The shaft 27 projects into the motor base member 28 and is connected by the coupling member 30 to the transmission shaft 31 which is provided with a splined end portion 32 engaging the upper end of the shaft of the gear 17. The transmission shaft is disposed centrally through the tubular steering column.

In the embodiment illustrated the coupling member 30 is provided with a brake element 34 connected thereto to rotate therewith. The motor base member is provided with an inwardly projecting flange like fixed brake element 35 positioned to coact with the driven brake element 34. The disc like thrust or brake actuating member 36 is engaged at one side with the pins 37 having coil springs 38 thereon acting to return the member 36 to retracted position.

The brake lever 39 is mounted on the projecting ears 40 on the base member 28 by means of the pivot pin 41. The brake lever in this embodiment is formed of two parts having outward offsets 42 to embrace the coupling member 30. The thrust member 36 is provided with upwardly projecting bosses 43 which the lever engages, see Figs. 3 and 4. The swinging end of the lever projects through an opening 44 in the base member 28 to be engaged by the foot pedal 45 pivoted on the base member at 46. It will be noted that this foot pedal is positioned so as to be manipulated by the operator occupying the seat 6.

A segmental steering gear 47 is mounted on the upper end of the steering column and secured thereto by the screws 48. A fixed stop 49 mounted on the support member 20 limits the stroke of the gear which is provided with angularly spaced stops 50 coacting with the stop 49.

The steering gear driving worm 51 is provided with a shaft 52 mounted in bearings 53 and 54 on the base member 28. The shaft 52 is provided with a beveled gear 55 meshing with the gear 56 on the vertical drive shaft 57. The drive shaft 57 is connected by the transmission shaft 58 and suitable universal joints 59 to the shaft 60 of the steering wheel 61.

The steering post 62 for the shaft 60 of the steering wheel is mounted on the top 63 of the hood or shield 64 which is mounted at the front end of the body to shield the motor and other parts positioned above the platform 10.

The motor control parts may be standard equipment, the driving and reversing switch conventionally shown at 65 being provided with an actuating handle 66. The control mechanism is conventionally illustrated at 67. The speed control foot lever 68 is connected to this mechanism by the connecting rod 69. The driving and control mechanism of my invention is simple and compact and at the same time the operating parts are well protected.

I have not attempted to illustrate or describe various modifications or adaptations of which my invention is capable as it is believed that this disclosure will enable those skilled in the art to embody or adapt the invention as may be desired.

Having thus described my invention, what I claim as new and desire to secure by Letters Patent is:

1. The combination with a chassis provided with rear wheels and having an operator's platform at its front end, front driving and steering wheels, a gear housing, axles for said front wheels mounted on said gear housing, an axle drive gear disposed within said housing, a vertically disposed driving worm mounted in said housing to coact with said gear, a tubular steering column integral with said housing projecting upwardly therefrom in alignment with said worm, a support member secured to said platform and receiving said steering column and provided with combined radial and axial thrust bearings therefor, a chambered motor base member mounted on said support member, a motor mounted on said motor base member with its shaft vertically disposed and depending into said motor base member, a transmission shaft disposed within said steering column and connected to said driving worm and projecting into said motor base member, a coupling member for said motor and transmission shafts provided with a brake element, said motor base member being provided with an inwardly projecting relatively fixed coacting brake element, a spring retracted thrust member mounted within said motor base member to coact with said brake element on said coupling a brake lever pivotally mounted at one side of said motor base member to coact with said thrust member and projecting from the opposite side of the base member, a brake pedal mounted on said motor base member to coact with the projecting end of said brake lever, a steering gear mounted on the upper end of said steering column within said motor base member, a steering gear driving worm rotatably mounted on said motor base member to coact with said steering gear, a stop on said motor base member limiting the rotative movement of said steering gear, an upright hood fixedly mounted on said chassis at the front of said motor and its said base member, and a steering wheel provided with a shaft rotatively mounted on said hood and having driving connection to said steering gear driving worm.

2. The combination with a chassis, front driving and steering wheels, a gear housing, axles for said front wheels mounted on said gear housing, an axle drive gear disposed within said housing, a vertically disposed driving worm mounted in said housing to coact with said gear, a tubular steering column integral with said housing projecting upwardly therefrom in alignment with said worm, a support member mounted on said chassis and receiving said steering column and provided with combined radial and axial thrust bearings therefor, a chambered motor base member mounted on said support member, a motor mounted on said motor base member with its shaft vertically disposed and depending into said motor base member, a transmission shaft disposed within said steering column and connected to said driving worm and projecting into said motor base member, a coupling member for said motor and transmission shafts provided with a brake element, said motor base member being provided with an inwardly projecting relatively fixed coacting brake element, a spring retracted thrust member mounted within said motor base member to coact with said brake element on said coupling, a brake lever pivotally mounted at one side of said motor base member to coact with said thrust member and projecting from the opposite side of the base member, a brake pedal mounted on said motor base member to coact with the projecting end of said brake lever, a steering gear mounted on the upper end of said steering column within said motor base member, a steering gear driving worm rotatably mounted on said motor base member to coact with said steering gear, a stop on said motor base member limiting the rotative movement of said steering gear, and a steering wheel provided with a shaft operatively connected to said steering gear driving worm.

3. The combination with a chassis provided with rear wheels and having an operator's platform at its front end, front driving and steering wheels, a gear housing, axles for said front wheels mounted on said gear housing, an axle drive gear disposed in a vertical plane in said housing, a vertical driving worm mounted in said housing to coact with the rear of said gear, a tubular steering column integral with said housing projecting upwardly therefrom in alignment with said worm, a support member secured to said platform and receiving the steering column, and provided with combined radial and axial thrust bearings therefor, a chambered motor base member mounted on said support member, a motor mounted on said motor base member with its shaft vertically disposed and depending into said motor base member, a transmission shaft disposed within said steering column and connected to said motor driving worm shaft, a steering gear in said motor base and connected to said column, a steering gear driving worm rotatably mounted on said motor base member to coact with said steering gear, a stop on said motor base member limiting the rotative movement of said steering gear, an upright hood fixedly mounted on said chassis at the front of said motor and its said base member, and a steering wheel provided with a shaft rotatively mounted on said hood and having driving connection to said steering gear driving worm.

4. The combination in a motor vehicle, including a body provided with rear wheels, of a front driving and steering wheel, a gear housing, an axle for said wheel mounted on said gear housing, an axle drive gear disposed within said housing, a vertically disposed driving worm mounted in said housing to coact with said gear, a tubular steering column projecting upwardly from said housing an alignment with said driving worm, a support member in which said steering column is rotatably mounted secured to said body, a chambered motor base member mounted on said supported member, a motor mounted on said motor base member with its shaft vertically disposed and depending into said motor base member, a transmission shaft disposed within said steering column and connected to said driving worm shaft and said motor shaft, a brake element connected to the motor shaft, said motor base member being provided with an inwardly projecting relatively fixed coacting brake element, a brake lever pivotally mounted on said motor base member and operatively associated with said brake element on said shaft, a steering gear mounted on said steering column within said motor base member, a steering gear driving worm rotatably mounted on said motor base member to coact with said steering gear, and a steering wheel having driving connection to said steering gear driving worm.

5. The combination in a motor vehicle including a body, of a driving and steering wheel disposed at the front end of the body, a gear housing, an axle for said wheel mounted on said gear housing, an axle drive gear disposed in an upright plane within said housing, a vertically disposed driving worm mounted on said housing to coact with the rear of said gear, a tubular steering column connected to and projecting upwardly from said housing in alignment with the axis of said driving worm and rotatably mounted on the vehicle body, a motor mounted on said vehicle body with its shaft in vertical alignment with the axis of said steering column, a transmission shaft disposed within said steering column and having driving connection with said driving worm, a coupling for said transmission and motor shafts, a brake element mounted on said coupling, a coacting relatively fixed brake element, means for actuating said first named brake element into engagement with said fixed brake element, a steering gear mounted on said steering column, a driving gear operatively associated with said steering gear, and a steering wheel having driving connection with said steering gear driving gear.

6. The combination in a motor vehicle including a body, of a driving and steering wheel, a gear housing, an axle for said wheel mounted on said gear housing, an axle drive gear disposed in an upright plane within said housing, a vertically disposed driving worm mounted in said housing to coact with the rear of said gear, a steering column rotatably mounted on the vehicle body to project upwardly from and fixedly connected to said housing in alignment with said worm, a motor mounted on said vehicle body with its shaft positioned vertically in alignment with said driving worm and having driving connections therewith, a steering gear mounted on said steering column, a driving gear for said steering gear, a steering wheel having driving connection with said steering gear, a brake element connected to said motor shaft to rotate therewith, a coacting relatively fixed brake element, and means for adjusting said first brake element into engagement with said relatively fixed brake element.

References Cited in the file of this patent

UNITED STATES PATENTS

| | | |
|---|---|---|
| 1,511,021 | Boring | Oct. 7, 1924 |
| 1,772,220 | Markey | Aug. 5, 1930 |
| 2,236,655 | Viau | Apr. 1, 1941 |
| 2,387,159 | Lee | Oct. 16, 1945 |
| 2,613,753 | Stuebing | Oct. 14, 1952 |

FOREIGN PATENTS

| | | |
|---|---|---|
| 601,850 | Germany | Aug. 25, 1934 |
| 619,931 | Great Britain | Mar. 16, 1949 |